United States Patent
Kasahara et al.

(10) Patent No.: US 9,916,046 B2
(45) Date of Patent: Mar. 13, 2018

(54) CONTROLLING MOVEMENT OF DISPLAYED OBJECTS BASED ON USER OPERATION

(75) Inventors: Shunichi Kasahara, Kanagawa (JP); Ritsuko Kano, Tokyo (JP); Tomoya Narita, Kanagawa (JP)

(73) Assignee: SONY CORPORATION, Tokyo (JP)

(*) Notice: Subject to any disclaimer, the term of this patent is extended or adjusted under 35 U.S.C. 154(b) by 857 days.

(21) Appl. No.: 13/219,956

(22) Filed: Aug. 29, 2011

(65) Prior Publication Data
US 2012/0056849 A1 Mar. 8, 2012

(30) Foreign Application Priority Data
Sep. 7, 2010 (JP) ................ P2010-199639

(51) Int. Cl.
*G06F 3/045* (2006.01)
*G06F 3/044* (2006.01)
*G06F 3/0488* (2013.01)

(52) U.S. Cl.
CPC .......... *G06F 3/044* (2013.01); *G06F 3/04883* (2013.01); *G06F 2203/04108* (2013.01)

(58) Field of Classification Search
CPC ..................................................... G06F 3/045
USPC ......... 345/173–179; 178/18.01–18.11, 19.01
See application file for complete search history.

(56) References Cited

U.S. PATENT DOCUMENTS 7,890,863 B2   2/2011  Grant et al.
8,373,669 B2 * 2/2013  Miernik ........................ 345/173
2008/0098331 A1 * 4/2008  Novick et al. ................ 715/835
2009/0058830 A1 * 3/2009  Herz et al. .................... 345/173
2011/0001709 A1 * 1/2011  Wang ..................... G06F 3/0485
                                                          345/173
2011/0083089 A1 * 4/2011  Pahud .................... G06F 3/0425
                                                          715/765

FOREIGN PATENT DOCUMENTS

JP   HEI-09-134270 A   5/1997
JP   2004-269054       9/2004
JP   2008-152441 A     3/2008
JP   2008-152441       7/2008
JP   2009-116769       5/2009

(Continued)

OTHER PUBLICATIONS

Official Action issued by Japanese Patent Office dated Sep. 24, 2014 in the counterpart Japanese Application No. 2010199639, dated Sep. 24, 2014.

*Primary Examiner* — Kent Chang
*Assistant Examiner* — Scott Au
(74) *Attorney, Agent, or Firm* — Chip Law Group

(57) ABSTRACT

An apparatus is provided that includes a first detection unit configured to determine whether or not a user control member is within a first threshold distance of the touch panel. The apparatus also includes a second detection unit configured to determine a direction of movement of the user control member with respect to a touch panel when the user control member is not in contact with the touch panel, and a display control unit configure to, when the user control member is determined to be moving within the threshold distance and in a predetermined direction, generate signals to alter a first displayed object such that the altered first displayed object appears to move closer to the user control member.

18 Claims, 12 Drawing Sheets

(56) References Cited

FOREIGN PATENT DOCUMENTS

| | | |
|---|---|---|
| JP | 2009-301282 A | 12/2009 |
| JP | 2010-146386 A | 1/2010 |
| JP | 2010-506302 | 2/2010 |
| JP | 2010-146386 | 7/2010 |

* cited by examiner

CONTROLLING MOVEMENT OF DISPLAYED OBJECTS BASED ON USER OPERATION

BACKGROUND

The present disclosure relates to an information processing device, an information processing method, and a computer program.

Touch panels make it possible to realize intuitive and easy-to-use user interfaces (hereinafter referred to also as "UIs"), and have therefore been used in the past in ticket dispensers of transportation systems, ATMs of banks, and the like. Recent touch panels can detect the movement of a user, and have made it possible to realize device operations unlike known button operations. Thus, touch panels have recently been used in portable devices such as portable telephones, game devices, and the like. For example, JP-T-2010-506302 discloses a device that generates a haptic effect on a device by starting a haptic feedback before a user touches an input region or area of a touch panel or the like on the basis of the presence of an object in the vicinity of the input region of the device.

SUMMARY

However, the only information on a finger that can be sensed by the touch panels in the past concerns states of the finger in contact. Thus, a user cannot operate a device until a finger comes into contact with a touch panel, and cannot recognize what process will be affected by bringing a finger into contact with the touch panel until the user actually brings a finger into contact with the touch panel.

Consideration will be given to a case where a desired object is selected from a plurality of objects displayed on a display section in a mobile terminal, a touch screen device of about an A4 size, or the like by an operation on a touch screen. At this time, when an object desired to be selected is situated at a position distant from a finger to perform the touch screen operation, the finger needs to be extended to operate the object, and thus an operation load on the user may be increased.

Further, in a case where an object group formed by a plurality of objects is displayed on the display section, when the object group is operated, a part of the objects of the object group exit a display region of the display section. When there is an object not displayed in the display region, the user needs to perform an operation of selecting the desired object after once moving the object group displayed in the display section, so that an operation load on the user may be increased.

Accordingly, the present disclosure has been made in view of the above problems, and it is desirable to provide an information processing device, an information processing method, and a computer program that are novel and improved, and which are capable of reducing an operation load on a user by changing the display position of an object to be operated according to the position of an operating object.

SUMMARY

In one exemplary embodiment, the present disclosure is directed to an apparatus including a first detection unit configured to determine whether or not a user control member is within a first threshold distance of the touch panel and a second detection unit configured to determine a direction of movement of the user control member with respect to a touch panel when the user control member is not in contact with the touch panel. The apparatus further includes a display control unit configure to, when the user control member is determined to be moving within the threshold distance and in a predetermined direction, generate signals to alter a first displayed object such that the altered first displayed object appears to move closer to the user control member.

In another exemplary embodiment, the present disclosure is directed to a method including determining a direction of movement of a user control member with respect to a touch panel when the user control member is not in contact with the touch panel. The method further includes determining whether or not the user control member is within a threshold distance of the touch panel. The method further includes, when the user control member is determined to be moving in a predetermined direction and is within the threshold distance, altering a first displayed object such that the altered first displayed object appears to move closer to the user control member.

In still another embodiment, the present disclosure is directed to a tangibly embodied non-transitory computer-readable medium storing instructions which, when executed by a processor, perform a method including determining a direction of movement of a user control member with respect to a touch panel when the user control member is not in contact with the touch panel. The method also includes determining whether or not the user control member is within a threshold distance of the touch panel and, when the user control member is determined to be moving in a predetermined direction and is within the threshold distance, altering a first displayed object such that the altered first displayed object appears to move closer to the user control member.

As described above, according to the present disclosure, it is possible to provide an information processing device, an information processing method, and a computer program capable of reducing an operation load on a user by changing the display position of an object to be operated according to the position of an operating object.

DETAILED DESCRIPTION OF THE PREFERRED EMBODIMENTS

Figure 1:
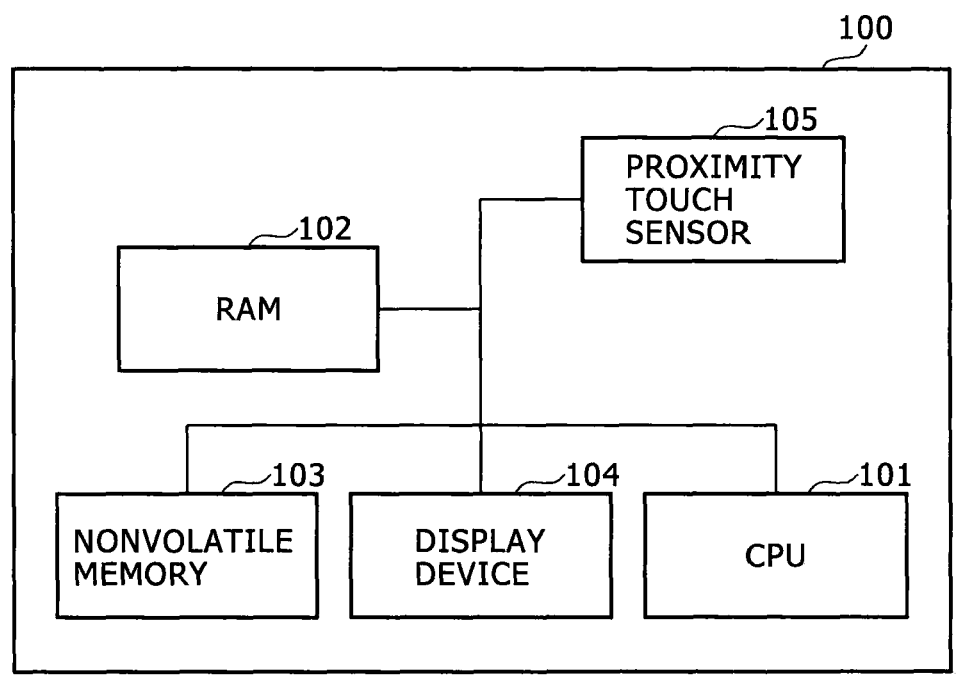
FIG. 1 is a block diagram showing an example of hardware configuration of an information processing device according to an embodiment of the present disclosure.

Preferred embodiments of the present disclosure will hereinafter be described in detail with reference to the accompanying drawings. Incidentally, in the present specification and the drawings, constituent elements having substantially identical functional constitutions are identified by the same reference numerals, and repeated description thereof will be omitted.

Description will be made in the following order: 1. Outline of Information Processing Device, 2. Functional Configuration of Information Processing Device, 3. Object Display Position Control Process.

1. Outline of Information Processing Device
Exemplary Hardware Configuration

Figure 2:
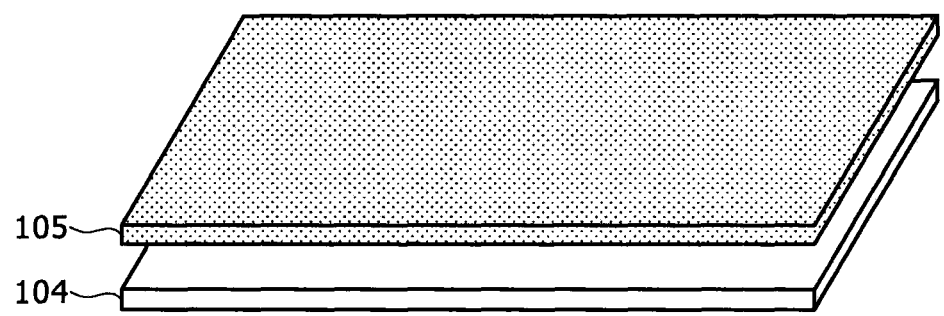
FIG. 2 is a diagram of assistance in explaining an example of hardware configuration of the information processing device according to the embodiment of FIG. 1.

An example of hardware configuration of an information processing device according to an embodiment of the present disclosure will first be described with reference to FIG. 1 and FIG. 2. Incidentally, FIG. 1 is a block diagram showing an example of hardware configuration of the information processing device 100 according to the present embodiment. FIG. 2 is a diagram of assistance in explaining an example of hardware configuration of the information processing device 100 according to the present embodiment.

The information processing device 100 according to the present embodiment is a device including a detecting unit capable of detecting the contact position (e.g., via a contact sensor) of an operating object (i.e., a user control member) on the display surface of a display device and capable of detecting a proximity distance between the display surface of the display device and the operating object located above the display surface. Various devices including devices having a small display device such as portable information terminals and smart phones, for example, are assumed, irrespective of the functions of the devices, may be information processing device 100.

As shown in FIG. 1, the information processing device 100 according to the present embodiment includes a CPU 101, a RAM (Random Access Memory) 102, a nonvolatile memory 103, a display device 104, and a proximity touch sensor 105, which may include or in conjunction with work with a contact sensor.

As described above, the CPU 101 functions as an arithmetic processing unit and a control device, and controls operation on the whole within the information processing device 100 according to various programs. The CPU 101 may also be a microprocessor. The RAM 102 temporarily stores a program used in execution of the CPU 101, parameters changing as appropriate in the execution of the CPU 101, and the like. These sections are interconnected by a host bus formed by a CPU bus or the like. The nonvolatile memory 103 stores programs used by the CPU 101, operation parameters, and the like. A ROM (Read Only Memory) or a flash memory, for example, can be used as the nonvolatile memory 103.

The display device 104 is an example of an output device for outputting information. A liquid crystal display (LCD) device or an OLED (Organic Light Emitting Diode) device, for example, can be used as the display device 104. The proximity touch sensor 105 is an example of an input device for a user to input information. The proximity touch sensor 105 includes for example input means for inputting information and an input control circuit for generating an input signal on the basis of the input by the user and outputting the input signal to the CPU 101.

In the information processing device 100 according to the present embodiment, as shown in FIG. 2, the proximity touch sensor 105 is provided in an exemplary state of being laminated to the display surface of the display device 104. Thereby, when the user brings a user control member (e.g., a finger, stylus or other appendage) or the like close to the display surface, the proximity touch sensor 105 can detect a distance from the display surface to the member.

Concept of Change in Display Position of GUI (Graphical User Interface)

Figure 3:
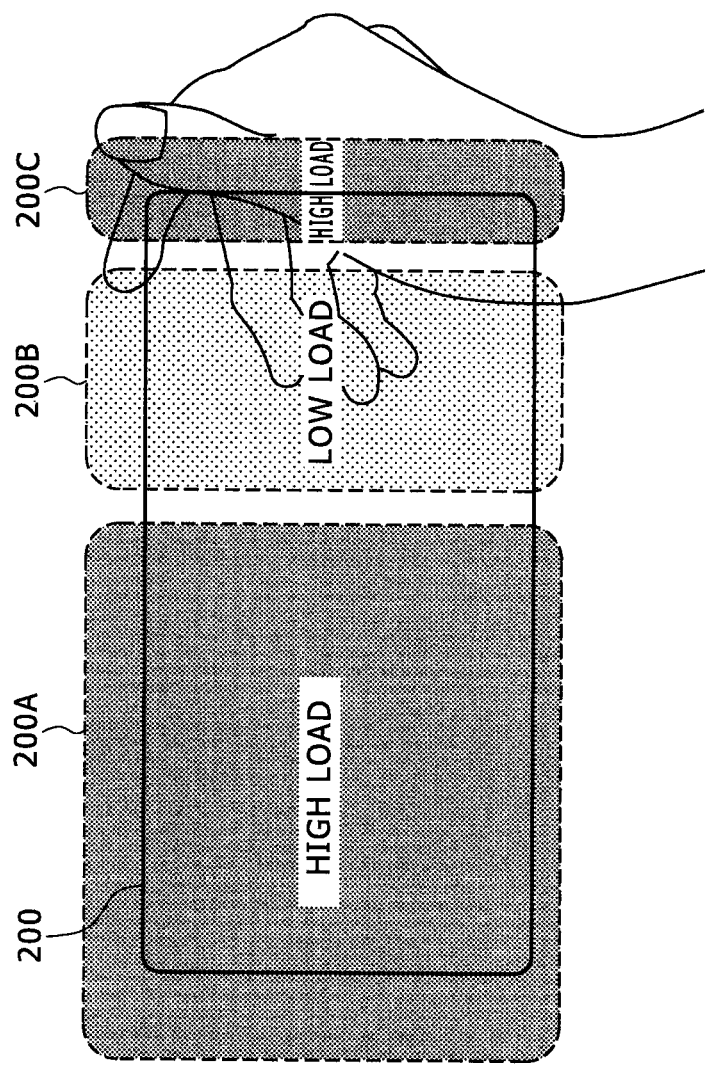
FIG. 3 is a diagram of assistance in explaining an operation load distribution when operating input is performed by one hand.

When the user operates a GUI such as an object or the like displayed in a display region (or area), the information processing device 100 according to the present embodiment changes the display position of the GUI dynamically according to the movement of the finger so as to facilitate the operation of the user. For example, as shown in FIG. 3, when the information processing device 100 is held by one hand, and a GUI displayed in a display region 200 is operated by the thumb of the hand holding the information processing device 100, the operation is easily performed in a region (low-load region) 200B corresponding to a movable range of the thumb. However, the thumb is not easily moved and the operation is difficult in a region 200A separated from the thumb on an opposite side from the hand and an edge 200C on the side of the holding hand (high-load regions).

Accordingly, when a predetermined position on a display region (or area) is set as an origin (reference position), and the thumb is extended from the origin to the opposite side from the holding hand, the information processing device 100 according to the present embodiment displays the GUI such that the GUI comes near to the side of the holding hand and approaches the extended thumb. In addition, when the thumb is moved from the origin to the side of the holding hand, that is, the edge on the side of the handing hand, the display position of the GUI is controlled such that the GUI appears to come nearer to the opposite side from the holding hand and approaches the thumb.

Figure 4:
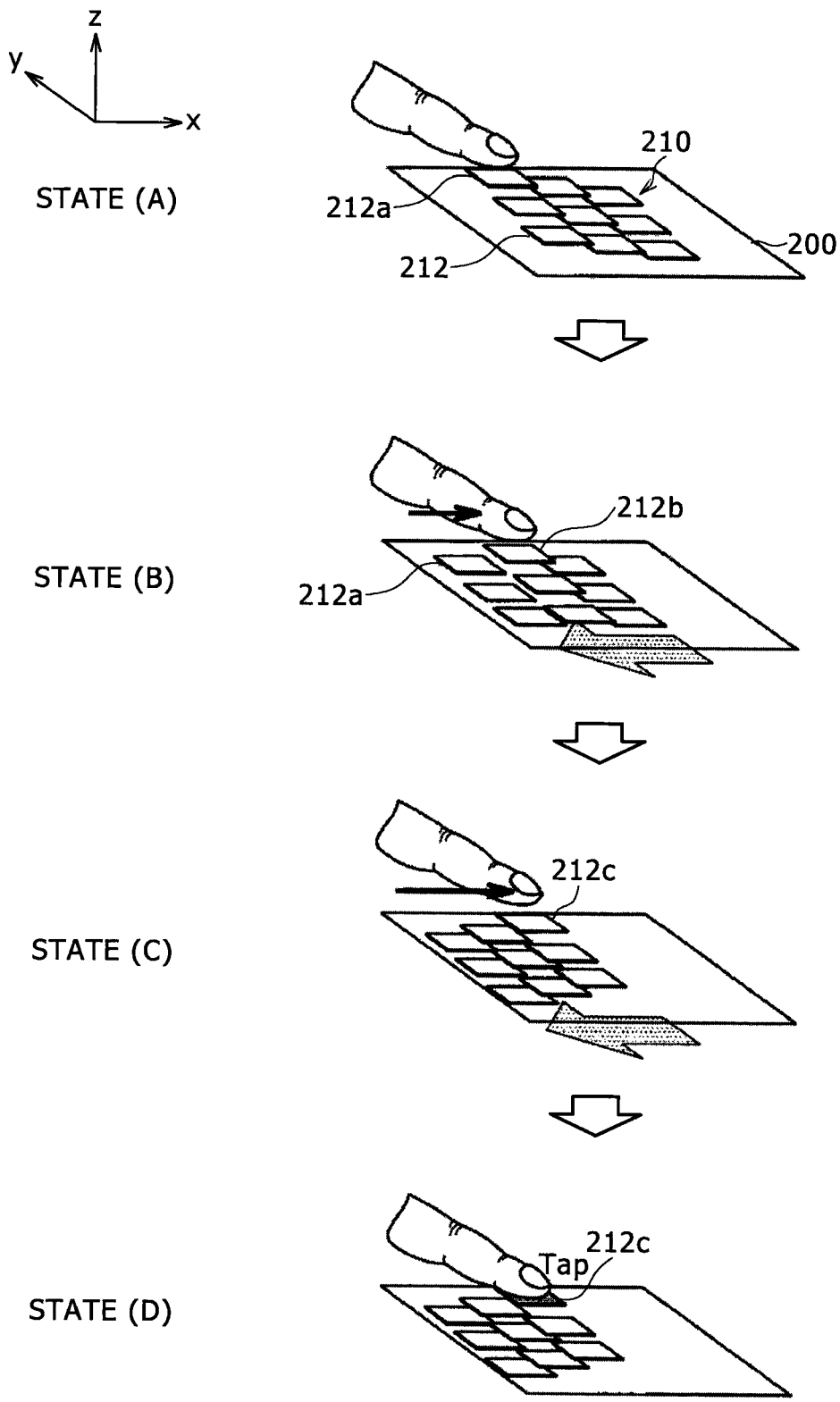
FIG. 4 is a diagram of assistance in explaining an outline of object display position control by the information processing device according to the embodiment of FIG. 1.

For example, as shown in FIG. 4, suppose that an object group 210 composed of a plurality of objects 212 is displayed in the display region 200. As shown in FIG. 4, the objects 212 are arranged and displayed in the form of a grid on an xy plane, for example. First, as shown in a state (A), when a finger is placed within a proximity sensing region separated by a predetermined distance from the display surface, an object 212*a* (e.g., a display object) situated at a position nearest to the position of the finger is displayed so as to be situated at a forward position (display surface side) in a direction of depth (z-direction), for example. At this time, the objects 212 other than the object 212a nearest to the finger may be displayed so as to sink in the direction of depth with increasing separation distance from the finger.

Next, when the finger is moved in an x-axis positive direction from the position in the state (A), the information processing device 100 determines that the user will operate an object situated on the x-axis positive direction side of the object 212a, and moves the object group 210 to an opposite side from the moving direction of the finger (in an x-axis negative direction by an object response distance). Thereby, the object 212 that the user intends to operate approaches the finger, so that the user can operate the desired object without greatly moving the finger. At this time, the position of each object 212 forming the object group 210 in the direction of depth also changes due to the movement of the finger and the object group 210. For example, when the object 212 nearest to the finger is changed from the object 212a to the object 212b, the object 212b is displayed so as to be situated at a most forward position. The objects 212 other than the object 212b are displayed so as to sink in the direction of depth with increasing separation distance from the finger.

Further, when the finger is moved in the x-axis positive direction from the position in the state (B), the object group 210 is further moved in the x-axis negative direction, as shown in a state (C). Then, when the object 212 nearest to the finger is changed from the object 212b to the object 212c, the object 212c is displayed so as to be situated at a most forward position. The objects 212 other than the object 212c are displayed so as to sink in the direction of depth with increasing separation distance from the finger.

Thereafter, when the user brings the finger into contact with the object 212c to be operated, the user can have a function associated with the object 212c performed. Thus, the information processing device 100 according to the present embodiment can dynamically move the objects 212 according to the movement of the finger of the user to enhance operability, and also show an object on which focus is being placed in such a manner as to be easily recognized visually. In the following, controlling the positions of the objects 212 by such an information processing device 100 and will be described in detail.

2. Functional Configuration of Information Processing Device

Figure 5:
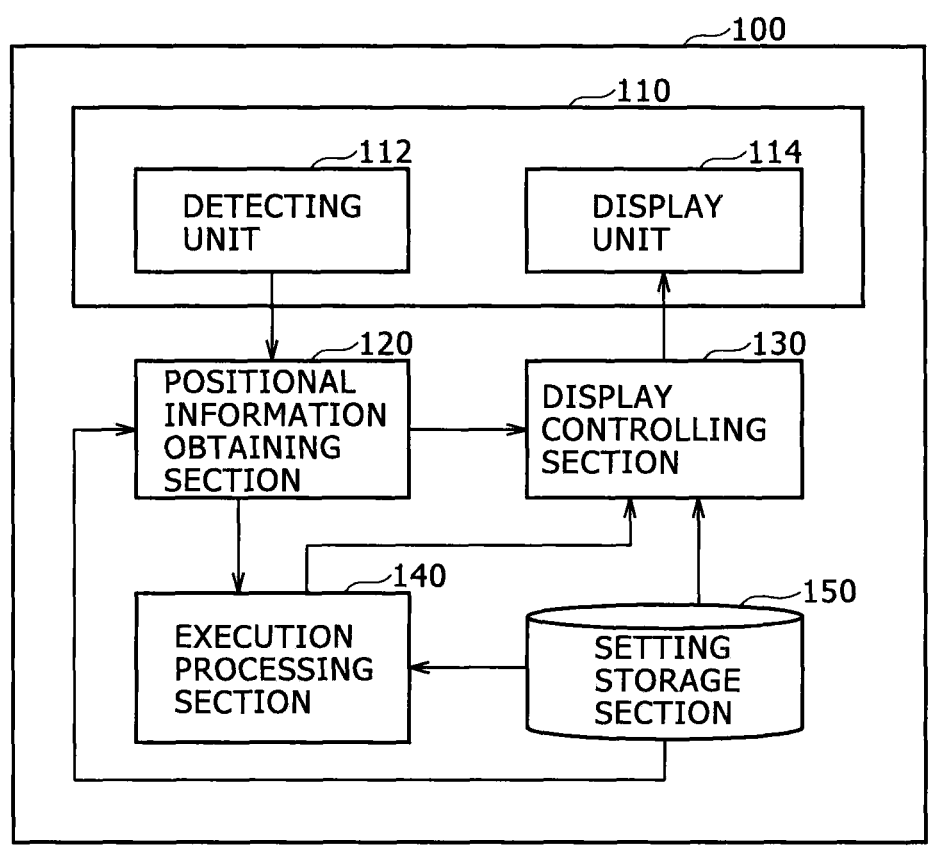
FIG. 5 is a block diagram showing a functional configuration of the information processing device according to the embodiment of FIG. 1.

A functional configuration of the information processing device 100 according to the present embodiment will first be described with reference to FIG. 5. FIG. 5 is a block diagram showing a functional configuration of the information processing device 100 according to the present embodiment.

As shown in FIG. 4, the information processing device 100 according to the present embodiment includes an input display section 110, a positional information obtaining section 120, a display controlling section 130, an execution processing section 140, and a setting storage section 150.

The input display section 110 is a functional part for displaying information and allowing information to be input. The input display section 110 includes a detecting unit 112 and a display unit 114. The detecting unit 112 corresponds to the proximity touch sensor 105 in FIG. 1. A capacitive type touch panel, for example, can be used for the detecting unit 112. However, any suitable technique may be used in conjunction with detection unit 212. For example, detector unit 212 may use optical or other techniques to detect a proximity between operating object and a display surface of the display unit 114. In the example case, the detecting unit 112 detects the value of a capacitance changing according to a proximity distance between an operating object and the display surface of the display unit 114.

When the operating object approaches the display surface to a predetermined distance or closer than the predetermined distance, the capacitance detected by the detecting unit 112 increases. As the operating object further approaches the display surface, the capacitance further increases. Then, when the operating object comes into contact with the display surface, the capacitance detected by the detecting unit 112 becomes a maximum. On the basis of the value of the capacitance detected by such a detecting unit 112, the positional information obtaining section 120 to be described later can obtain the positional information of the operating object with respect to the display surface of the display unit 114. The detecting unit 112 outputs the value of the detected capacitance as a result of detection to the positional information obtaining section 120.

The display unit 114 is an output device for displaying information, which device corresponds to the display device 104 in FIG. 1. The display unit 114 displays, for example, GUI objects and contents or the like associated with the objects. In addition, when the display controlling section 130 has changed a form of display of objects, the display unit 114 displays the objects after the change on the basis of object display change information notified from the display controlling section 130.

The positional information obtaining section 120 obtains positional information indicating positional relation between the operating object and the display surface of the display unit 114 on the basis of the detection result input from the detecting unit 112. The positional information obtaining section may obtain positional information based on any suitable data type (e.g., capacitive or optical data). As described above, the higher the value of the capacitance detected by the detecting unit 112 becomes, the closer to the display surface the operating object becomes, and the value of the capacitance becomes a maximum when the operating object comes into contact with the display surface. A correspondence between the value of the capacitance and a proximity distance (or a proximity sensing region) is stored in advance in the setting storage section 150 to be described below. Referring to the setting storage section 150, the positional information obtaining section 120 obtains the position of the finger in a vertical direction (e.g., a z-direction) with respect to the display surface on the basis of the value of the capacitance input from the detecting unit 112.

In addition, the positional information obtaining section 120 identifies the position of the operating object on the display surface of the display unit 114 (e.g., on the xy plane) on the basis of the detection result input from the detecting unit 112. Suppose, for example, that the detecting unit 112 is formed by a capacitive sensor substrate where a capacitance detecting grid for detecting an x-coordinate and a y-coordinate is formed. In this case, the detecting unit 112 can identify the position of the operating object on the substrate (e.g., on the display surface) from a change in capacitance of each grid cell in response to contact of the operating object. For example, the coordinate position of a highest capacitance can be identified as coordinates of the position where the finger is closer to the display surface. Alternatively, the barycentric position of a region where capacitances of a predetermined value or higher are detected may be set as coordinates of the position where the finger is closer to the display surface.

The positional information obtaining section 120 can thus obtain positional information with respect to the display surface of the display unit 114. The obtained operating object positional information is output to the display controlling section 130 and the execution processing section 140.

The display controlling section 130 controls the display positions of the objects displayed on the display unit 114 on the basis of the positional information obtained by the positional information obtaining section 120. As described with reference to FIG. 3 and FIG. 4, the display controlling section 130 controls the display positions of the objects 212 according to the movement of the finger of the user so that the user easily operates an object 212 displayed on the display unit 114. When the display controlling section 130 has determined a change in the display positions of the objects 212, the display controlling section 130 generates an image of the objects after the change, and outputs the image to the display unit 114. In addition, the display controlling section 130 performs display control in response to an instruction of the execution processing section 140 to be described below to change the object 212 displayed at the position of contact of the finger. Details of this object display position correcting process will be described below.

In response to a predetermined operating input to the information processing device 100, the execution processing section 140 performs a function associated with the operating input. For example, when the detecting unit 112 senses that the user has brought a finger into contact with a certain object 212 displayed on the display unit 114, the execution processing section 140 recognizes that the finger has come into contact with the object 212 on the basis of positional information input from the positional information obtaining section 120. Then, the execution processing section 140 identifies the object 212 with which the finger has come into contact, and performs a function associated with the object 212. Incidentally, the selected object 212 can be changed according to the moving speed of the finger selecting the object 212. Details of the object display position correcting process will be described later.

The setting storage section 150 stores, as setting information, information used at a time of calculation of a proximity distance between the operating object and the display surface, information used at a time of generation of positional information on the position of the operating object on the display surface, and other information used at a time of the object display position controlling process. The setting storage section 150 stores, for example, correspondences between the value of the capacitance and the proximity distance. The positional information obtaining section 120 can obtain a position corresponding to the value of the capacitance which value is input from the detecting unit 112 referring to such correspondences. In addition, the setting storage section 150 stores processing contents (functions) to be performed in correspondence with operating input performed to the objects 212 by the user. The setting storage section 150 further stores the moving speed (threshold value) of the finger for starting the object display position correcting process. The setting information stored in the setting storage section 150 may be stored in advance, or may be set by the user.

The information processing device 100 according to the present embodiment may include for example a memory for temporarily storing information necessary in the object display position controlling process and the like.

3. Object Display Position Control Process

The information processing device 100 according to the present embodiment can detect the movement of a finger on the display surface by having the above-described functions. Then, using these pieces of information, the information processing device 100 controls the display positions of objects 212 displayed on the display unit 114 according to the movement of the finger, whereby operability can be improved. The object display position controlling process by the information processing device 100 according to the present embodiment will be described in the following with reference to FIGS. 6 to 13.

Figure 6:
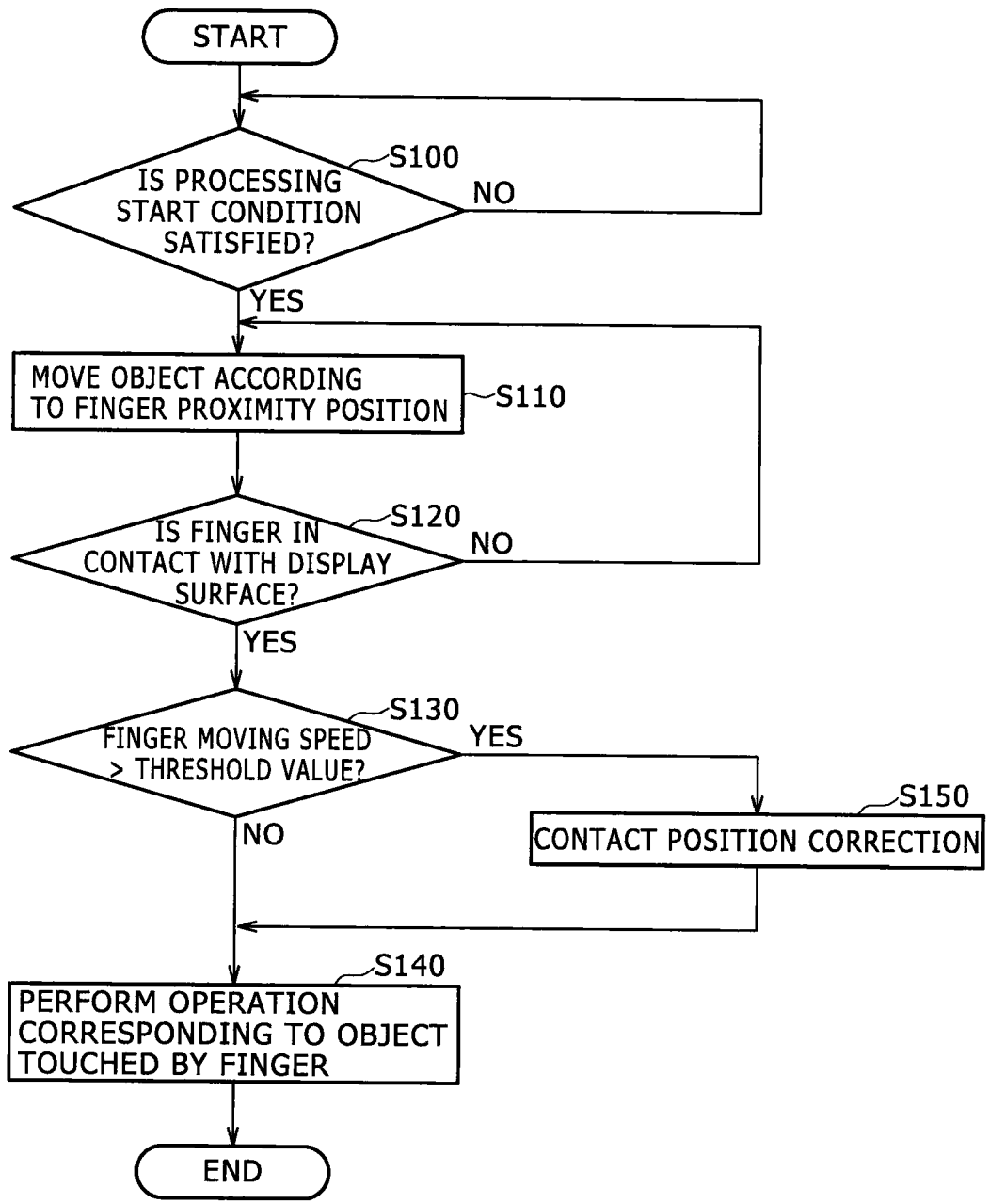
FIG. 6 is a flowchart of an object display position controlling process by the information processing device according to the embodiment of FIG. 1.
Figure 7:
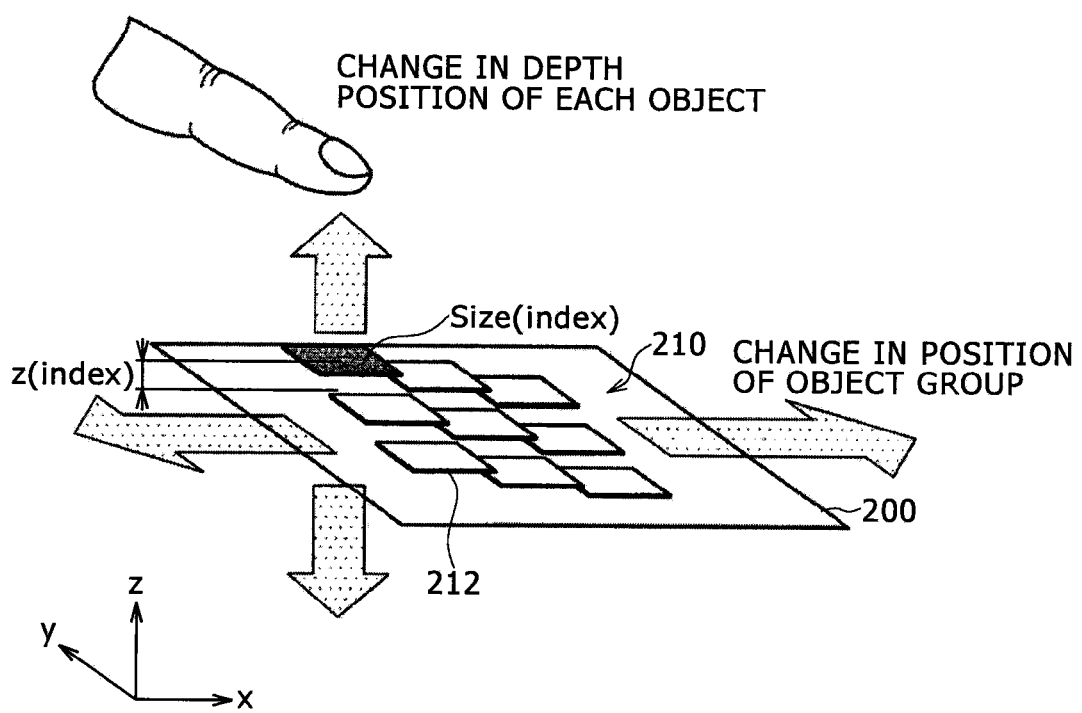
FIG. 7 is a diagram of assistance in explaining display position changes made to an object group and objects.
Figure 8:
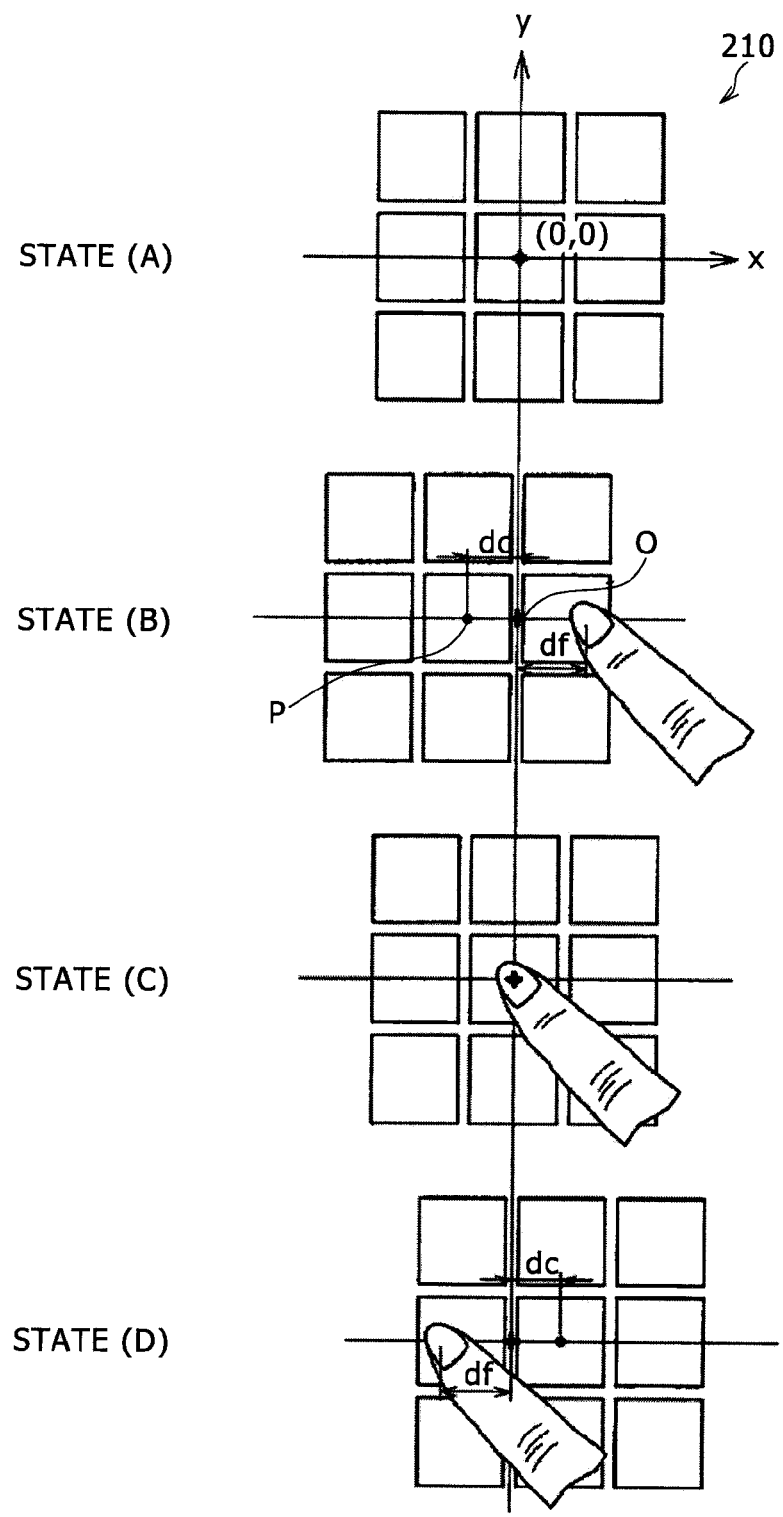
FIG. 8 is a diagram of assistance in explaining an example of control of the display position of the object group by the information processing device according to the embodiment of FIG. 1.
Figure 9:
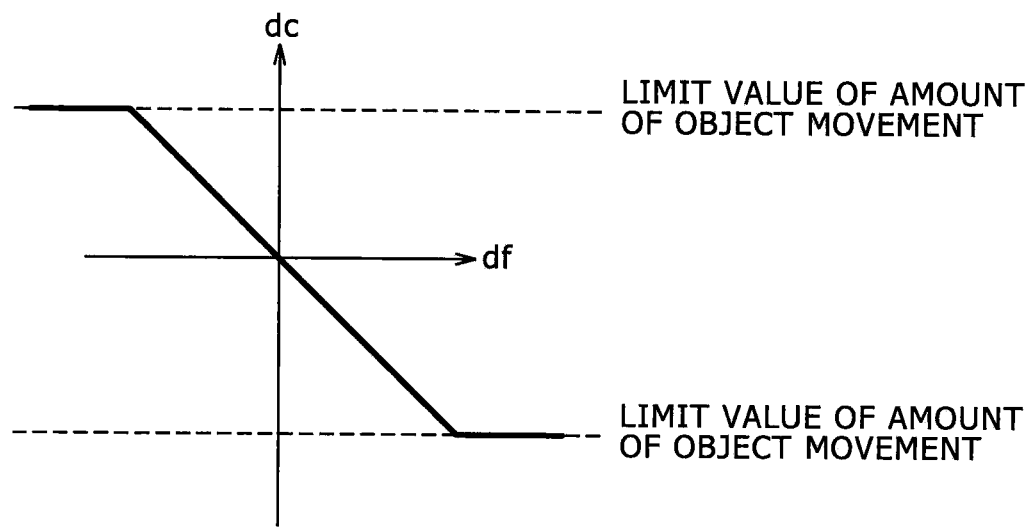
FIG. 9 is a graph showing an example of relation between an amount of movement of a finger and an amount of movement of an object group.
Figure 10:
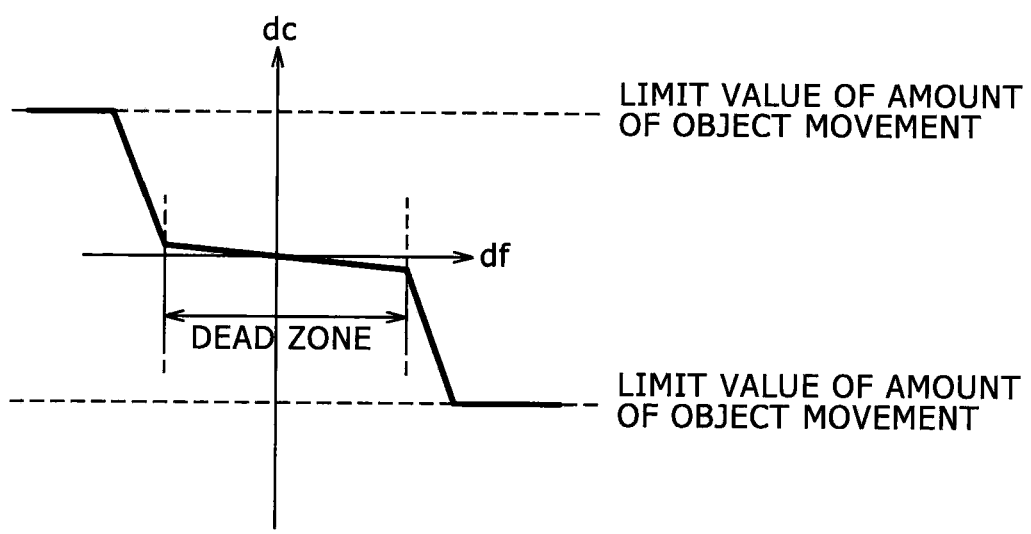
FIG. 10 is a graph showing another example of relation between an amount of movement of a finger and an amount of movement of an object group.
Figure 11:
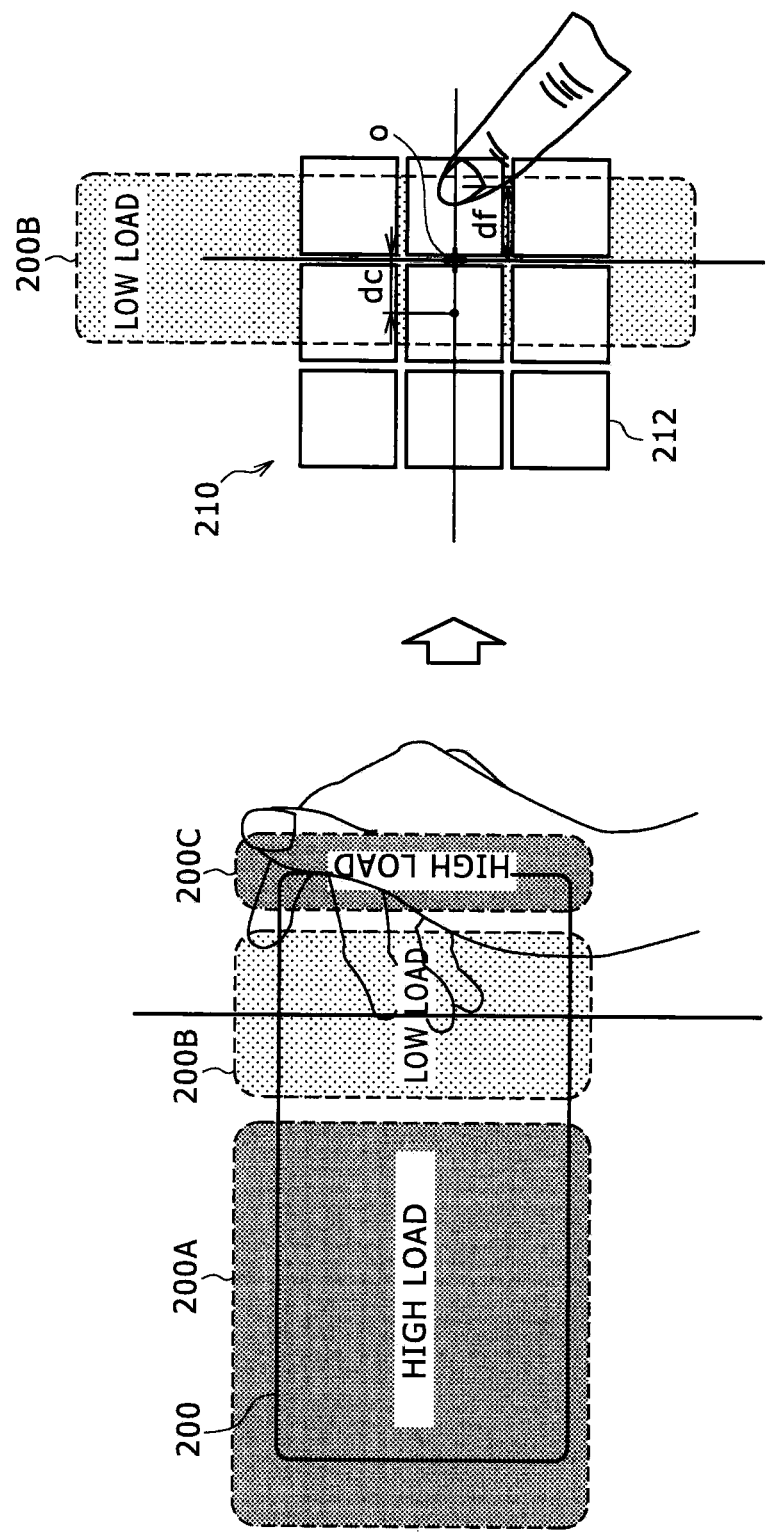
FIG. 11 is a diagram of assistance in explaining the setting of a reference position in consideration of operation loads on a device.
Figure 12:
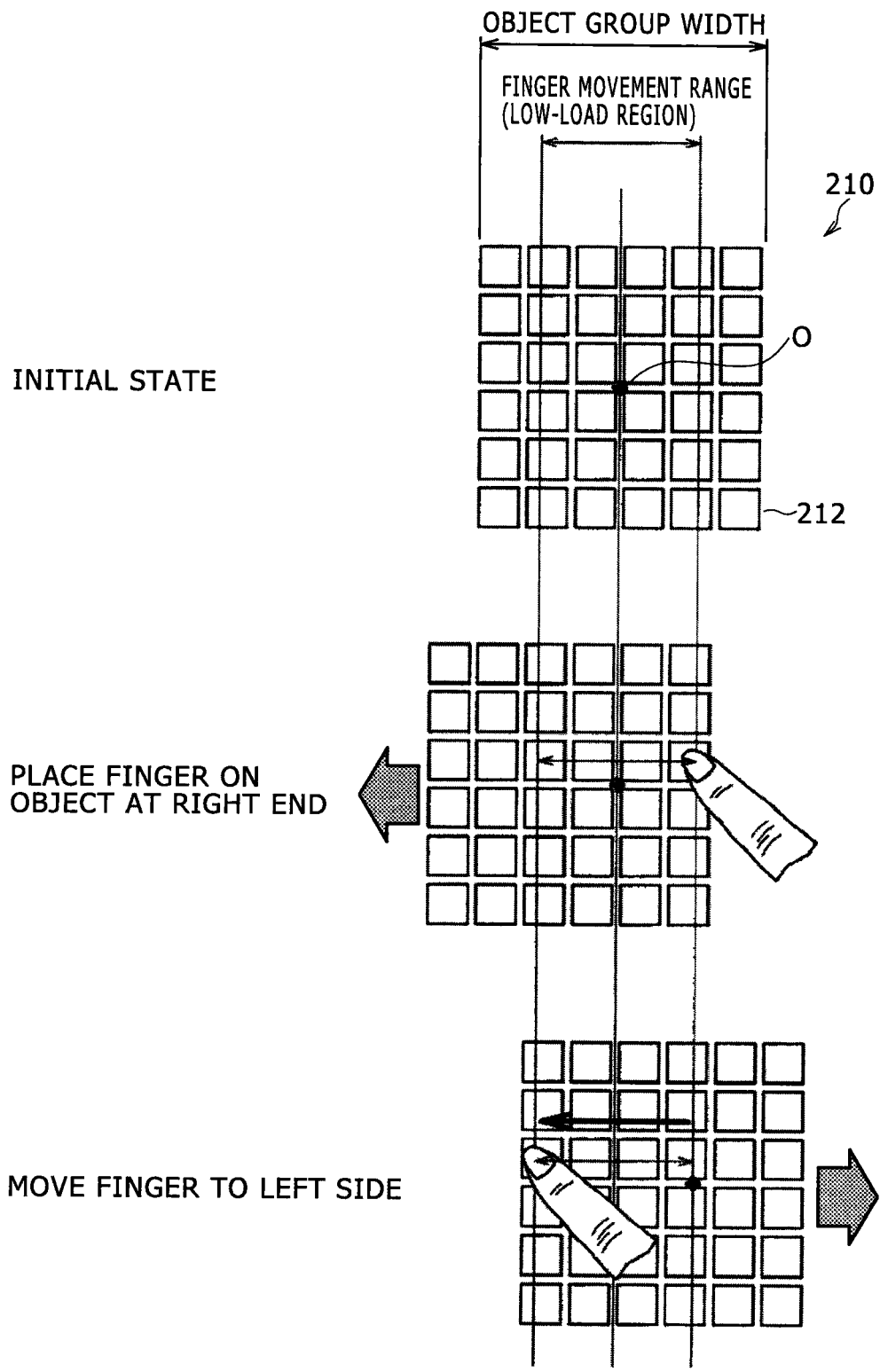
FIG. 12 is a diagram of assistance in explaining relation between the width of an object group and the moving range of a finger.
Figure 13:
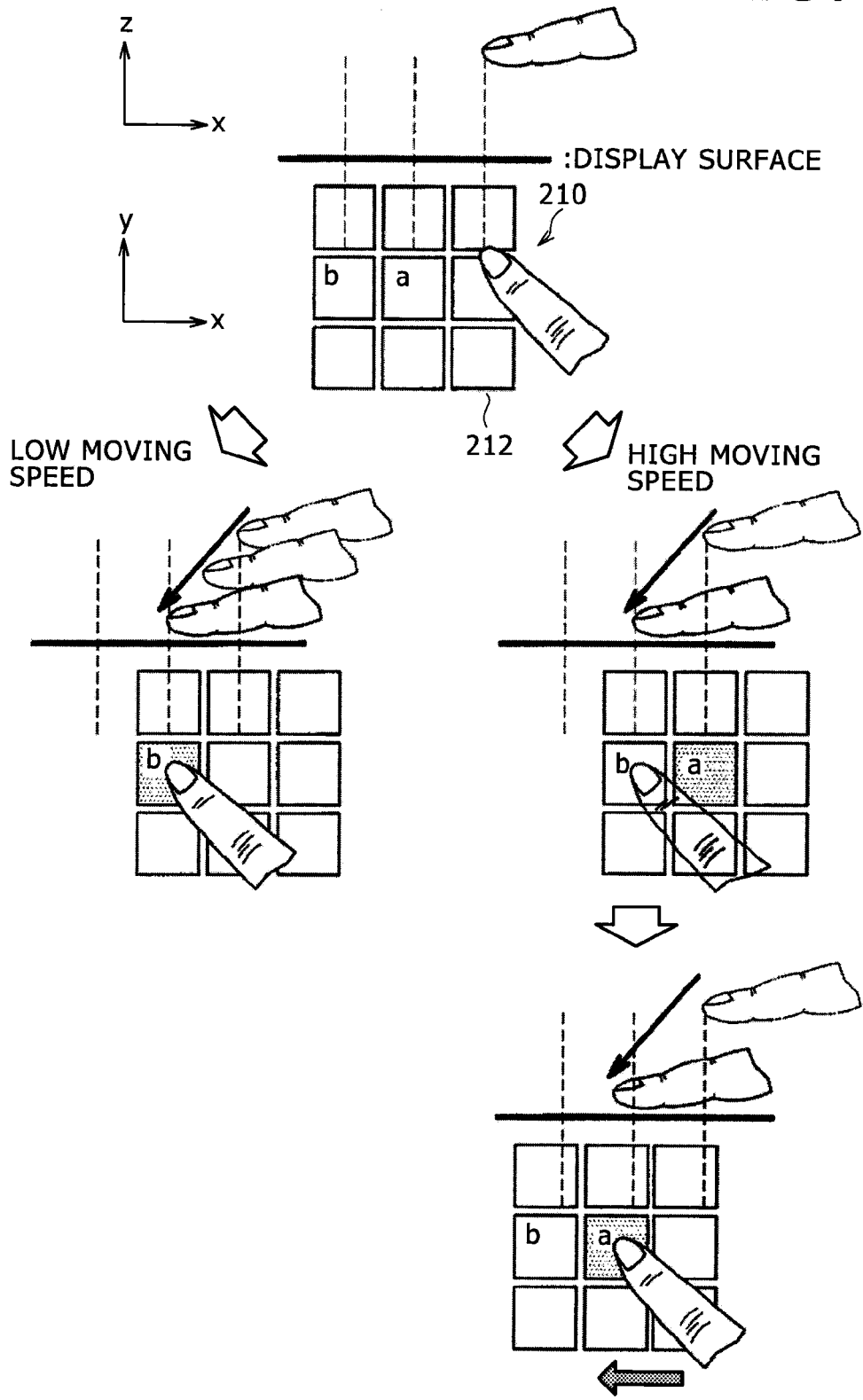
FIG. 13 is a diagram of assistance in explaining a contact position correcting process.

FIG. 6 is a flowchart of the object display position controlling process by the information processing device 100 according to the present embodiment. FIG. 7 is a diagram of assistance in explaining display position change made to an object group 210 and objects 212. FIG. 8 is a diagram of assistance in explaining an example of control of the display position of the object group by the information processing device 100 according to the present embodiment. FIG. 9 and FIG. 10 are graphs showing an exemplary relation between an amount of movement of a finger in two different areas of the touchpad and an amount of movement of the object group. FIG. 11 is a diagram of assistance in explaining a setting of a reference position in consideration of operation loads on the device. FIG. 12 is a diagram of assistance in explaining a relation between the width of the object group 210 and a range of movement of a finger. FIG. 13 is a diagram of assistance in explaining a contact position correcting process.

S100: Process Start Condition Determination

As shown in FIG. 6, the information processing device 100 first determines whether a condition for starting a process of controlling the display positions of objects 212 is satisfied (S100). The condition for starting the process of controlling the display positions of the objects 212 can be set, as appropriate. A case where a finger is positioned within a proximity sensing region or a case where a predetermined time has passed since a finger was positioned within the proximity sensing region, for example, can be the condition for starting the process of controlling the display positions of the objects 212. In addition, for example, in a case where an on-screen keyboard formed by arranging a plurality of keys is displayed on the display unit 114, the process of controlling the display positions of the objects 212 (e.g., keys) may be performed when a key input is performed.

When an operation of performing an operating input for selecting an object 212 displayed on the display unit 114 is started, the information processing device 100 determines that the condition for starting the process of controlling the display positions of the objects 212 is satisfied, and starts a process of step S110. On the other hand, when an operation as the condition for starting the process is not detected in step S100, the process of step S100 is repeated until the operation is detected.

S110: Object Display Position Control

When the process of controlling the display positions of the objects 212 is started, the display positions of the objects 212 are changed and the objects 212 are moved according to the proximity position of the finger with respect to the display surface (S110). As a result of the display positions of the objects 212 being controlled, a change in the position of the object group 210 and a change in position in the direction of depth of each object 212 occur, as shown in FIG. 7, for example.

Control of Display Position of Object Group

First, the display controlling section 130 moves the object group 210 on the xy plane in an opposite direction from the moving direction of the finger. Thereby, the object group 210 is moved so as to meet the moving finger and that the finger can be brought into contact with a desired object 212 with a small movement of the finger. This is effective particularly in a case where operating input is performed by one hand, and the number of objects 212 that can be touched by a finger of the holding hand can be increased as compared with a case of the past.

Describing the movement of the object group 210 in more detail, as shown in a state (A) of FIG. 8, a reference position O (0, 0) is set to the object group 210. On the basis of the reference position, a distance df from the reference position O to the finger and a distance dc from the reference position O to a center P of the object group are defined. The reference position O may be, for example, a position where the user first places a finger above the object group 210 or a position set in advance. In addition, as will be described later, the reference position O may be set from a relation to a region of a low operation load on the user.

Next, as in a state (B) of FIG. 8, when the user moves the finger in an x-axis positive direction, the object group 210 is moved in an x-axis negative direction. An amount df of movement of the finger and an amount dc of movement of the object group 210 at this time can be set, as shown in FIG. 9, for example. The amount (df) of movement of the finger and the amount (dc) of movement of the object group 210 are in linear relation to each other. When the finger moves in the positive direction, the object group 210 is moved in the negative direction. Conversely, when the finger moves in the negative direction, the object group 210 is moved in the positive direction. In addition, limits (amount of object movement limit values) are set for the movement of the object group 210 so that the object group 210 can be prevented from having a part out of a frame. Thus, even when the finger moves from the reference position O by a predetermined distance or more, the object group 210 is not moved beyond the amount of object movement limit value.

The amount (df) of movement of the finger and the amount (dc) of movement of the object group 210 may also be set as shown in FIG. 10, for example. In FIG. 10, a dead zone is set with the reference position O as a center. In the interval of a predetermined distance by which the finger is separated from the reference position O (dead zone), the amount of movement of the object group 210 with respect to the amount of movement of the finger is smaller than in the case of FIG. 9, that is, a weight for the amount of movement of the object group 210 is set small. Thus, in the dead zone, the object group 210 reacts only slightly even when the finger is moved. By setting the dead zone, it is possible to prevent a desired object 212 from passing the position of the finger when the object group 210 moves greatly according to the movement of the finger in the vicinity of the reference position O. Incidentally, also in the case of FIG. 10, as in FIG. 9, amount of object movement limit values may be set so that the object group 210 can be prevented from having a part out of a frame.

The relations between the amount (df) of movement of the finger and the amount (dc) of movement of the object group 210 as shown in FIG. 9 and FIG. 10 exemplary, and the present disclosure is not limited to such examples. For example, the relation between the amount (df) of movement of the finger and the amount (dc) of movement of the object group 210 does not need to be a linear relation, but may be set such that the amount (dc) of movement of the object group 210 increases exponentially with increase in the amount df of movement of the finger.

Control of Display Positions of Objects

In addition, the display controlling section 130 moves each object 212 in a z-direction according to a degree of proximity of each object 212 to the finger. Specifically, as shown in FIG. 7, an object 212 at a position (e.g., virtual distance) closer to the finger is displayed on a more forward side to thereby increase response to the approach of the finger (i.e., decrease a virtual distance between the finger and the object 212), and an object 212 at a position more distant from the finger is displayed on a more rearward side to thereby decrease response to the approach of the finger. Thereby, an object 212 on which focus is placed can be presented to the user in an easily recognizable manner. A moving distance Z(index) in the z-direction of an object 212 can be defined as in the following Equation 1, for example.

$$Z(\text{index}) = fz(d(\text{focus\_index}, \text{index})) \quad \text{(Equation 1)}$$

Index denotes a unique number for identifying each object 212, and d(focus_index, index) denotes a distance between an object 212 on which focus is being placed now and another object 212. The depth function fz shown in Equation 1 can be set such that an object 212 closer to the object 212 on which focus is placed is displayed at a more forward position.

In addition, the objects 212 may also be changed in size according to positional relation to the finger. For example, an object 212 at a position closer to the finger is increased in size, and an object 212 at a position more distant from the finger is decreased in size. By thus setting the sizes of the objects 212, it is possible to express response to the approach of the finger, and prevent an object 212 from lying off a display region, that is, prevent an object 212 from going out of a frame when the object group 210 is moved so as to approach an edge part of the display region 200.

Specifically, the size Size(index) of an object 212 can be defined as in the following Equation 2, for example. An area function fs shown in Equation 2 is basically set such that an object 212 closer to an object 212 on which focus is placed is displayed in a larger size.

$$\text{Size}(\text{index}) = fs(d(\text{focus\_index}, \text{index})) \quad \text{(Equation 2)}$$

Relation between Control of Display Positions of Object Group and Objects and Operation Loads The movement of the object group 210 and each object 212 according to the movement of the finger has been described above with reference to FIGS. 7 to 10. However, the reference position O for the movement of the object group 210 and the relations between the amount of movement of the finger and the amount of movement of the object group 210 as shown in FIG. 9 and FIG. 10 are desirably determined according to operation loads, as shown in FIG. 3. As shown in a left figure of FIG. 11, the display region 200 of the information processing device 100 can be divided into high-load regions 200A and 200C and a low-load region 200B according to states in which the user performs operating input. In this case, the display controlling section 130 moves the object group 210 so that the object group 210 can be operated within the low-load region 200B in the display region 200, whereby operability can be improved.

Specifically, as shown in a right figure of FIG. 11, for example, the reference position O is provided at the center of the low-load region 200B in the display region 200 of the information processing device 100. Then, the relation between the amount of movement of the finger and the amount of movement of the object group 210 is set such that all the objects 212 of the object group 210 can be touched by the movement of the finger within the low-load region 200B. A device with a low operating load can be realized by thus setting parameters such as the reference position O, the relation between the amount of movement of the finger and the amount of movement of the object group 210, and the like in consideration of a region of easy operation for the user on the basis of the shape of the device and the disposition of hands and fingers when the device is operated.

By thus setting each parameter, as shown in FIG. 12, a finger moving range can be made smaller than the width of the object group 210, and the finger moving range can be contained within a region of a low operating load. Thus, when the user moves the finger in a right direction with an intention of operating an object 212 situated at a right edge with respect to the reference position O, position control is performed such that the object group 210 is moved in a left direction so that the object 212 at the right edge can be touched within the low-load region. On the other hand, when the user moves the finger in the left direction with an intention of operating an object 212 situated at a left edge with respect to the reference position O, position control is performed such that the object group 210 is moved in the right direction so that the object 212 at the left edge can be touched within the low-load region.

S120: Determination of Presence or Absence of Contact of Finger with Display Surface Returning to the description of FIG. 6, when the display positions of the object group 210 and the objects 212 are controlled according to the movement of the finger in step S110, the execution processing section 140 determines whether the finger has been brought into contact with the display surface on the basis of positional information (S120). The execution processing section 140 performs a function associated with an object 212 touched by the finger. For this, the execution processing section 140 determines from the positional information whether the user has brought the finger into contact with the display surface to select an object 212 in the object group 210. The process of step S110 and step S120 is repeated until the finger is brought into contact with the display surface.

S130: Determination for Possible Contact Position Correction

Then, when the execution processing section 140 determines that the finger has been brought into contact with the display surface, the execution processing section 140 obtains a moving speed when the finger came into contact with the display surface on the basis of the positional information, and determines whether the moving speed is higher than a predetermined speed (S130). The information processing device 100 according to the present embodiment improves operability by identifying an object 212 that the user intends to operate more accurately. In this case, when the moving speed of the finger is high, it is difficult for the user to bring the finger into contact with the object 212 to be operated accurately, and the possibility of occurrence of an erroneous operation is increased.

Accordingly, in step S130, the moving speed of the finger is obtained, whether the obtained moving speed of the finger is higher than a predetermined speed is determined, and whether it is necessary to correct the object 212 selected by bringing the finger into contact with the display surface is thereby determined. Specifically, when the moving speed of the finger is higher than the predetermined speed, the information processing device 100 determines that there is a strong possibility of an erroneous operation, determines an object 212 to be operated by correcting the selected object 212, and changes the display positions of the objects 212.

Incidentally, when a proximity distance between the display surface and the finger in a direction perpendicular to the display surface of the display unit 114 can be obtained, the moving speed of the finger can be obtained by time differentiation of the proximity distance. In addition, when the proximity distance between the display surface and the finger in the direction perpendicular to the display surface of the display unit 114 cannot be obtained, the execution processing section 140 can obtain the moving speed of the finger by measuring a time taken for the finger whose predetermined proximity state was detected to touch the display surface. Specifically, the execution processing section 140 can obtain the moving speed of the finger by dividing a distance d from the display surface to a position where the proximity state was detected by the time taken for the finger to touch the display surface.

S140: Performance of Processing Corresponding to Selected Object

Suppose that as shown in FIG. 13, for example, the finger is obliquely moved from a position above the display surface to the display surface, comes into contact with the display surface, and comes into contact with a certain object 212. At this time, when the moving speed of the finger is equal to or lower than the predetermined speed, it is considered that the user brought the finger into contact while confirming the position of the object 212 to be operated (for example, an object 212(b)). Thus, in this case, the execution processing section 140 performs a function associated with the object 212(b) touched by the finger (S140).

S150: Contact Position Correcting Process

On the other hand, when the moving speed of the finger is higher than the predetermined speed, the user may have brought the finger into contact without confirming the position of the object 212 to be operated, and the finger may be in contact with a wrong object 212. Accordingly, the execution processing section 140 makes the setting storage section 150 correct the display position of the object group 210 so that the object 212 on which focus was placed before the finger was brought into contact with the display surface is selected (S150).

A history of the objects 212 on which focus has been placed is stored in a memory (not shown). The execution processing section 140 determines the object 212 to be selected by referring to the history. For example, an object on which focus was placed immediately before the finger was moved at the predetermined speed or higher can be set as the object 212 to be selected by the correction.

Determining the object 212 to be selected after the correction, the execution processing section 140 makes the display controlling section 130 move the object group 210 so that the object 212 in question is situated at the position touched by the finger. Suppose, for example, that in the example shown in FIG. 13, an object 212(a) is determined as an object to be selected after the correction. At this time, when the object 212(b) is displayed at the position touched by the finger, the display controlling section 130 moves the object group 210, and makes correction such that the object 212(a) is situated at the position touched by the finger. Thus, the object 212 considered to be selected by the user is set in a selected state which can be detected visually, whereby the user can perform operating input without any sense of incongruity. Then, the execution processing section 140 performs a function associated with the object 212(a) to be selected after the correction (S140).

The object display position controlling process by the information processing device 100 according to the present embodiment has been described above. Such an object display position controlling process changes the display positions of the object group 210 and the objects 212 forming the object group 210 according to the movement of the finger in a proximity state, so that the user can easily predict a possible phenomenon before operating an object 212. In addition, the above process displays the objects 212 such that the objects 212 approach the finger in the proximity state. Thus, even when operation is performed by one hand, an object 212 to be operated can be selected easily.

Further, by changing the positions in the direction of depth of the objects 212 according to the position of the finger in the proximity state, an object 212 on which focus is placed is easily recognized visually. In addition, by setting a limit value to the amount of movement of the object group 210 and changing the sizes of the objects 212 on the basis of relation to the position of the finger in the proximity state, the object group 210 can be prevented from extending beyond the display region 200. It is thereby possible to prevent a degradation in bird's-eye view characteristics.

While preferred embodiments of the present disclosure have been described in detail above with reference to the accompanying drawings, the present disclosure is not limited to such examples. Various examples of changes or modifications within the scope of technical concepts described in claims can occur to those who have ordinary knowledge in a technical field to which the present disclosure pertains, and it is naturally understood that these examples fall within the technical scope of the present disclosure.

Figure 14:
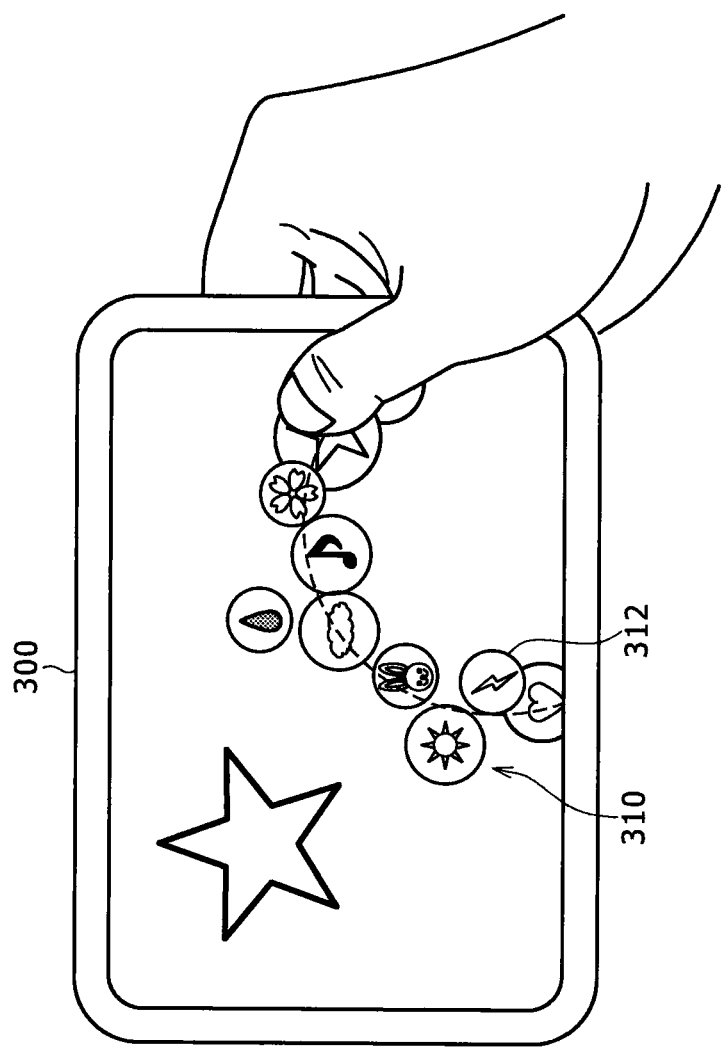
FIG. 14 is a diagram of assistance in explaining an example of display of an object group composed of a plurality of objects.

For example, while the object group 210 is arranged in the form of a grid in the foregoing embodiments, the present disclosure is not limited to such an example. For example, as shown in FIG. 14, there may be an object group 310 formed by arranging objects 312 in the form of a circle. Also in this case, as in the foregoing embodiments, the display position of the object group 310 and the display positions in a direction of depth of the objects 312 are changed according to the position of a finger in a proximity state. In the case where the objects 312 are arranged in the form of a circle as shown in FIG. 14, the display positions of the objects 312 may be changed by revolving the objects 312 such that the objects 312 approach the finger along a direction of the arrangement, for example.

The present disclosure contains subject matter related to that disclosed in Japanese Priority Patent Application JP 2010-199639 filed in the Japan Patent Office on Sep. 7, 2010, the entire content of which is hereby incorporated by reference.

What is claimed is:

1. An apparatus, comprising:
   a central processing unit (CPU) configured to:
      determine whether a user control member is within a first threshold distance from a display surface based on a first detected capacitance value;
      a direction of movement, with respect to the display surface, of the user control member,
         wherein the determination of the direction of movement is based on a second detected capacitance value, the user control member that is not in contact with the display surface and the user control member that is within the first threshold distance from the display surface;
      detect a horizontal movement, with respect to the display surface, of the user control member based on the user control member that is not in the contact with the display surface;
      generate signals to alter a first displayed object of a plurality of displayed objects such that the altered first displayed object appears to move closer to the user control member in a direction of a depth of the display surface, based on the user control member that is in a state of movement within the first threshold distance from the display surface;
      generate signals to alter remaining displayed objects of the plurality of displayed objects such that the altered remaining displayed objects are displayed so as to sink in the direction of the depth with an increase in a separation distance from the user control member, based on the user control member that is in the state of movement within the first threshold distance from the display surface; and
      generate signals to move the plurality of displayed objects in a direction opposite to a direction of the horizontal movement, with respect to the display surface, of the user control member, based on the user control member that is in the state of movement within the first threshold distance from the display surface.

2. The apparatus of claim 1, further comprising a proximity sensor configured to detect the contact of the user control member with the display surface,
   wherein the CPU is further configured to generate signals to select a second displayed object of the plurality of displayed objects based on the user control member that is in the contact with the display surface.

3. The apparatus of claim 2, wherein the altered first displayed object and the selected second displayed object are a same object.

4. The apparatus of claim 2, wherein the proximity sensor is a capacitive sensor.

5. The apparatus of claim 1, wherein the CPU is further configured to generate signals to limit the movement of the plurality of displayed objects by an object movement limit value, based on the horizontal movement, of the user control member, that is greater than a second threshold distance.

6. The apparatus of claim 1, wherein the CPU is further configured to generate signals to move the plurality of displayed objects based on the detected horizontal movement that is less than a second threshold distance.

7. The apparatus of claim 1, wherein
   the CPU is further configured to:
      detect a proximity of the user control member to a first region of the display surface, and
      generate signals to move the first displayed object from a second region of the display surface to the first region of the display surface, upon the detection of the proximity of the user control member to the first region.

8. The apparatus of claim 1, wherein
   the CPU is further configured to:
      detect a movement of the user control member by a distance inside a third region of the display surface;
      detect the movement of the user control member by the distance outside of the third region;
      generate signals to move the first displayed object by a first object response distance, based on the detection of the movement of the user control member by the distance inside the third region; and
      generate signals to move the first displayed object by a second object response distance, based on the detection of the movement of the user control member by the distance outside the third region, wherein the first object response distance is different from the second object response distance.

9. The apparatus of claim 8,
   wherein the first object response distance is related to the distance inside the third region by a first relation,
   wherein the second object response distance is related to the distance outside the third region by a second relation, and wherein the first relation and the second relation are linear.

10. The apparatus of claim 9, wherein a slope of a first linear relation between the first object response distance and the distance inside the third region is greater than a slope of a second linear relation between the second object response distance and the distance outside the third region.

11. The apparatus of claim 1, wherein
the CPU first detection unit is further configured to:
detect the user control member is on one of a third displayed object of the plurality of displayed objects or a fourth displayed object of the plurality of displayed objects;
change a virtual distance between the third displayed object and the user control member from a first virtual distance to a second virtual distance, based on the detection of the user control member that is on the third displayed object; and
change a virtual distance between the fourth displayed object and the user control member from the first virtual distance to the second virtual distance and the virtual distance between the third displayed object and the user control member from the second virtual distance to a third virtual distance, based on the detection of the user control member that is on the fourth displayed object.

12. The apparatus of claim 11, wherein the first virtual distance is greater than the second virtual distance, and wherein the third virtual distance depends on a separation distance of the user control member from the third displayed object.

13. The apparatus of claim 11, wherein the first virtual distance, the second virtual distance and the third virtual distance differ at least in the direction of the depth.

14. The apparatus of claim 11, wherein the CPU is further configured to change an appearance of the third displayed object and the fourth displayed object between a first size and a second size.

15. The apparatus of claim 14, wherein the second size is larger than the first size.

16. The apparatus of claim 1, wherein
the CPU is further configured to detect a movement of the user control member from a first position to a second position and a speed of movement from the first position to the second position, and
alter the first displayed object that corresponds to the first position based on the speed of movement that is less than a threshold.

17. A method, comprising:
determining whether a user control member is within a threshold distance from a display surface based on a first detected capacitance value;
determining a direction of movement, with respect to the display surface, of the user control member,
wherein the determination of the direction of movement of the user control member is based on a second detected capacitance value, the user control member that is not in contact with the display surface and the user control member that is within the threshold distance from the display surface;
detecting a horizontal movement, with respect to the display surface, of the user control member based on the user control member that is not in the contact with the display surface;
determining that the user control member is moving within the threshold distance from the display surface;
altering a first displayed object of a plurality of displayed objects such that the altered first displayed object appears to move closer to the user control member in a direction of a depth of the display surface, based on the determination that the user control member is moving within the threshold distance from the display surface;
altering remaining displayed objects of the plurality of displayed objects such that the altered remaining displayed objects are displayed so as to sink in the direction of the depth with increasing a separation distance from the user control member, based on the determination that the user control member is moving within the threshold distance from the display surface; and
moving the plurality of displayed objects in a direction opposite to a direction of the horizontal movement, with respect to the display surface, of the user control member, based on the determination that the user control member is moving within the threshold distance from the display surface.

18. A non-transitory computer-readable medium having stored thereon computer-executable instructions that, when executed by a computer, cause the computer to execute operations, the operations comprising:
determining whether a user control member is within a threshold distance from a display surface based on a first detected capacitance value;
determining a direction of movement, with respect to the display surface, of the user control member,
wherein the determination of the direction of movement is based on a second detected capacitance value, the user control member that is not in contact with the display surface and the user control member that is within the threshold distance from the display surface;
detecting a horizontal movement, with respect to the display surface, of the user control member based on the user control member that is not in the contact with the display surface;
determining the user control member is moving within the threshold distance from the display surface;
altering a first displayed object of a plurality of displayed objects such that the altered first displayed object appears to move closer to the user control member in a direction of a depth of the display surface, based on the determination that the user control member is moving within the threshold distance from the display surface;
altering remaining displayed objects of the plurality of displayed objects such that the altered remaining displayed objects are displayed so as to sink in the direction of the depth with increasing a separation distance from the user control member, based on the determination that the user control member is moving within the threshold distance from the display surface; and
moving the plurality of displayed objects in a direction opposite to a direction of the horizontal movement, with respect to the display surface, of the user control member, based on the determination that the user control member is moving within the threshold distance from the display surface.

* * * * *